United States Patent Office 3,383,307
Patented May 14, 1968

3,383,307
GELLING AGENTS, GELS AND METHODS FOR FORMING GELS
Donald C. Goetz, Minneapolis, Minn., assignor, by mesne assignments, to Ashland Oil and Refining Company, a corporation of Kentucky
No Drawing. Filed July 30, 1964, Ser. No. 386,403
10 Claims. (Cl. 252—316)

The present invention relates to gelling agents, to gels, and to methods for forming gels. In one aspect, the present invention relates to a novel technique wherein certain polysaccharides can be used to gel water. In another aspect, the present invention relates to methods for gelling water wherein the primary component of the gelling agent is a polysaccharide of the type produced from carbohydrates by the action of bacteria of the genus Xanthomonas.

Considerable interest in polysaccharides produced by the bacterial fermentation of carbohydrates has been exhibited in recent years. Impetus has been given to the commercial development of these polysaccharides by the discovery that certain biochemically synthesized polysaccharides have properties which permit their use as thickening agents for water. The tremendous thickening power of these particular polysaccharides has resulted in such suggested uses as foam enhancers for beer, as emulsion stabilizers for mayonnaise and the like, and as water thickening agents for use in secondary recovery operations carried out in the petroleum industry. For example, it has been found that these biochemically synthesized polysaccharide materials may be added to water or brine in suitable concentrations to produce very viscous solutions which are relatively stable under the conditions which prevail in subsurface oil reservoirs. By utilizing these viscous solutions in place of the water or brine normally employed in water flooding projects, a very favorable mobility ratio between the oil in the reservoir and the liquid used to displace it can be obtained.

It has now been discovered, and this discovery forms a basis for the present invention, that it is possible to make gels by adding a polysaccharide, of the type previously described, to water at rather low levels, e.g. from 0.05 to 5 weight precent or more, usually from 0.1 to 1 weight percent, and more preferably from about 0.2 to 0.75 weight percent based on the weight of water. Into this thickened water is then added a salt of a trivalent metal (e.g. aluminum sulfate) and, if desired, a metallic promoter such as powdered zinc metal (e.g. 325 mesh). The addition of a trivalent metal salt such as aluminum sulfate and a metallic promoter such as powered zinc, to the polysaccharide-thickened water, results in gel formation. This order of mixing (i.e. first adding the polysaccharide and then the other materials) is preferred, although gels can be formed regardless of the order of addition.

A significant advantage of the present invention over the prior art is the extremely low level of gelling agent required to give a gel, and the fact that ordinary ambient conditions may be used. Moreover, the selection and concentration of the necessary chemicals may be varied to control the rate of gel formation. Interestingly enough, the gel appears to be reversible on the addition of strongly alkaline materials such a sodium hydroxide. Such reversibility suggests the use of these gels in secondary recovery operations where temporary blocking may be achieved.

Using a trivalent metal salt and a metallic promoter at a polysaccharide level of about 0.1 weight percent, a gel will usually form rapidly (i.e. within about one minute), but significant amounts of free water are sometimes present. With a polysaccharide level of 0.25 weight percent, a gel can usually be formed within 2 to 10 minutes, but some free water is often evident after gel formation. With 0.5 percent polysaccharide, the gel forms more slowly, but the final gel will usually bind all of the water. The increase in time required for gelation can probably be attributed to the higher viscosity that accompanies any increase in polysaccharide concentration. Higher levels of the metallic promoter, e.g. zinc, will give faster gelation. The concentration of trivalent metal salt, e.g. aluminum sulfate, is important as regards the speed of gelation since a large excess of trivalent salt (e.g. over 400 weight percent of aluminum sulfate) will often slow gelation. When using zinc as the promoter, it appears that concentrations of aluminum sulfate (calculated as $Al_2(SO_4)_3 \cdot 18H_2O$) of about 25 to 300 weight percent, e.g. 50 to 200 weight percent, based on the weight of polysaccharide present, represent the best level.

This unique discovery provides a flexible method for forming gels under ambient conditions, although other conditions may be used, if desired. For example, in fighting fires, the powdered ingredients may be added to water and sprayed over burning debris, etc. By proper selection of ingredients, a gel can be made to form almost immediately. These gels adhere to many surfaces and, thus, water will not run off. Consequently, oxygen will be more effectively excluded and the fire can be more quickly extinguished. The polysaccharide and trivalent metal salt, with or without a metallic promoter, may be dry mixed in any combination, or wet mixed into at least two components. Gelation will begin when all the necessary ingredients are brought together in the presence of water. Where the polysaccharides have been used in the prior art (e.g. oil recovery), a trivalent metal salt, with or without a promoter, may be added to cause the polysaccharide thickened water to gel. Such a procedure could be followed to aid in clean-up, etc., as well as in oil recovery operations where the trivalent metal salt, with or without a metallic promoter, could be sent into a well to cause the polysaccharide-thickened water to gel. Dry mixtures of polysaccharide and trivalent metal salt, with or without a metallic promoter, can also be used as waterproofing agents for such things as dynamite.

The polysaccharides useful in the present invention are those produced by the action of bacteria of the genus Xanthomonas on carbonhydrates. These biochemically synthesized polysaccharides are commonly referred to by those skilled in the art as industrial gums. Various methods for the biochemical production of gums with Xanthomonas organisms are known. See for example, U.S. Patent Nos. 3,020,206 and 3,020,207. Broadly described, these known processes for preparing polysaccharides involve the preparation of a broth containing a carbohydrate nutrient, e.g. a cereal grain flour, preferably in a finely ground form. The nutrient is heat sterilized to kill extraneous bacteria which produce unwanted products. The broth, ordinarily countaining about 100 parts by weight of water, will usually contain from 1 to 5 parts by weight of a suitable carbohydrate nutrient, organic nitrogen sources, and appropriate trace elements. This broth is then inoculated with bacteria of the genus Xanthomonas (e.g. *Xanthomonas campestris*) and fermented under aerobic conditions. pH control (usually between about 5 and 8.5, e.g. from 6.5 to 7.2) is necessary to achieve optimum yields. Fermentation is allowed to proceed until the culture viscosity has reached a desired level, usually on the order of 3000 to 12,000 centipoises. At this point, the desired gum may be recovered by any suitable procedure. Spray drying is one effective recovery technique that has been used. After proper drying, the gum will usually be a slightly colored, light, fluffy powder.

Although the present invention is not known to be dependent in any significant way upon the detailed manner of preparation of these industrial gums, it should be realized that variations in the manner of preparation, and in recovery techniques, will result in the production of gum proucts having slightly different properties. Consequently, while all known methods for producing polysaccharides from carbohydates by the action of bacteria of the genus Xanthomonas may be used to produce a gum product which is effective in practicing the present invention, it will be appreciated that certain variations will exist depending upon the particular method of preparation that is selected. Excellent results have been obtained by utilizing a gum produced from cereal grain, e.g. sorghum grain flour, wherein pH control was accomplished through the use of buffer salt added to the culture medium and the bacteria were selected from the species *Xanthomonas campestris*.

The amount of gum needed for forming the gels of the present invention will be a water thickening amount, generally from about 0.05 to 5 or more weight percent, usually from 0.1 to 1 weight percent, and preferably from 0.20 to 0.75 weight percent, e.g. 0.5 weight percent, based on the total weight of water.

Suitable trivalent metal salts for use in this invention include the trivalent metal salts of inorganic acids, e.g. aluminum sulfate, ferric sulfate, chromic chloride, chromic sulfate and the like. The sulfates are the preferred metal salts and aluminum sulfate is especially preferred. These salts can be used in any of their usual forms, i.e. anhydrous or hydrated. The amount of trivalent metal salt to be used will be a sensible amout, i.e. an effective amount ranging from more than incidental impurities. As a rough guide, when salts other than aluminum sulfate are employed, the amount of such salt to be used will ordinarily be an amount sufficient to give a molar amount of the trivalent metal approximately equal to the molar amount of aluminum present when aluminum sulfate is used. Circumstances may dictate a change from this quideline, however. Mixtures of the salts may be used, if desired.

The amount of aluminum sulfate used in practicing the present invention (calculated as $Al_2(SO_4)_3 \cdot 18H_2O$) will generally be from 20 to 400 or more weight percent and more usually from about 25 to 300 weight percent e.g. 50–200 weight percent based on the weight of polysaccharide present. Frequently, it is convenient to operate with about 100 weight percent aluminum sulfate (i.e. one gram of $Al_2(SO_4)_3 \cdot 18H_2O$ for each gram of gum).

The metallic promoters useful in practicing the present invention are the hydrogen displacing metals, i.e. those metals higher in the electrochemical series than hydrogen (e.g. zinc and nickel). These promoters increase the rate of gelation. Their use is optional, but quite preferred. For example, aluminum sulfate is much more effective when used with a promoter such as zinc. On the other hand, ferric sulfate is extremely effective when used alone.

These metals will preferably be in a finely divided form, e.g. ground or powdered. Particles having a size as small or smaller than 325 mesh are especially desirable. The powdered metals commonly used in laboratories are well suited. Alternately, these metals may be used in the same form as conventional catalysts, e.g. supported on an inert substrate. In all instances, the metal should have a high surface/volume ratio. The amount of metallic promoter employed will be a sensible amount, ordinarily from 2 to 60 or more weight percent, usually from 5 to 35 weight weight percent, e.g. 10 to 30 weight percent, based on the weight of the polysaccharide present. Twenty weight percent is an especially effective amount for most purposes. Reduction of particle size increases the effectiveness of the metallic promoters in gel formation. Zinc is the preferred metallic promoter. Mixtures of the metals may be used, if desired.

As previously indicated, the ingredients in the gelling agent (i.e., polysaccharide and trivalent metal salt, with or without a metallic promoter) can be mixed to form a single, dry package. Alternatively, the ingredients may be kept separate (wet or dry) until it is desired to form the gel. The trivalent metal salt and metallic promoter may be mixed together to form a gelling agent for polysaccharide-thickened water. The rate at which gelation takes place can be controlled by consideration of the following criteria: first, increasing the content of metallic promoter, as well as reducing particle size, accelerates gel formation; second, increasing the gum concentration increases viscosity which tends to retard the rate of gel formation after an optimum gel rate and gel structure combination is reached at a gum concentration of from about 0.20 to 0.75 weight percent; and third, extremely high concentrations of the trivalent metal salts e.g., above 400 weight percent aluminum sulfate, tend to slow gel formation.

The present invention will be more clearly understood by reference to the follownig specific examples which include a preferred embodiment. Unless otherwise indicated, all parts are by weight and all percentages are by weight.

Examples 1–17

The compositions of Examples 1–8 and 10–16 were prepared under ordinary room conditions by simply mixing the gum (Archer Daniels Midland Co. developmental product 7097) and water to form a viscous solution. To this solution was then added powdered zinc metal. Next, a 10% aqueous solution of $Al_2(SO_4)_3 \cdot 18H_2O$ was admixed with the gum solution containing the powdered zinc metal. Examples 9 and 17 were exceptions to this method of preparation. Example 9 was prepared by using dry aluminum sulfate instead of an aqueous solution. In Example 17, all three ingredients in the gelling agent were first mixed together, dry, and then blended into water with a Waring blender. The compositions of the examples, and the condition of the gels formed, are shown in Table I.

TABLE I.—FORMATION OF GELS WITH XANTHOMONAS GUMS

| Example No. | Amount of Gum, weight percent based on water | Amount of zinc, weight percent based on gum | Amount of $Al_2(SO_4)_3 \cdot 18H_2O$, weight percent based on gum | Remarks |
| --- | --- | --- | --- | --- |
| 1 | 0.1 | 20 | 100 | Gel formed in 5 minutes; considerable free water. |
| 2 | 0.1 | 20 | 400 | Do. |
| 3 | 0.25 | 10 | 24 | Some gel formed in 5 minutes; very poor gel. |
| 4 | 0.25 | 10 | 56 | Some gel formed in 5 minutes; gel soft with some free water. |
| 5 | 0.25 | 10 | 80 | Some gel formed in 5 minutes; gel soft with some free water; increasing sulfate in this range improves gel. |
| 6 | 0.25 | 20 | 24 | Starts to gel in 1 minute; increase in zinc level accelerates gel formation; good gel in 10 min. |
| 7 | 0.25 | 20 | 48 | Starts to gel immediately; fair gel in 5 minutes. |
| 8 | 0.25 | 20 | 104 | Fair gel in 1 minute; good gel in 3 minutes; very good gel in 10 minutes. |

TABLE I.—FORMATION OF GELS WITH XANTHOMONAS GUMS—Continued

| Example No. | Amount of Gum, weight percent based on water | Amount of zinc, weight percent based on gum | Amount of $Al_2(SO_4)_3 \cdot 18H_2O$, weight percent based on gum | Remarks |
|---|---|---|---|---|
| 9 | 0.25 | 20 | 128 | Gel starts in 2 minutes; fair gel in 5 minutes. |
| 10 | 0.25 | 20 | (dry) 128 | Gel starts in 1 minute; good gel in 6 minutes. |
| 11 | 0.25 | 20 | 160 | Very solid gel in 2 minutes; can be sliced. |
| 12 | 0.25 | 20 | 320 | Some gel in 10 minutes; good gel in 15 minutes; sulfate now slowing rate of gel. |
| 13 | 0.50 | 20 | 12 | Very thick; slight gel after 10 minutes. |
| 14 | 0.50 | 20 | 24 | Poor gel in 10 minutes. |
| 15 | 0.50 | 20 | 72 | Some gel in 10 minutes; very solid gel in 16 hrs; no free water. |
| 16 | 0.50 | 20 | 120 | Very good gel in 30 minutes; no free water. |
| 17 | 0.50 | 20 | 100 | Good gel in 1 minute; a small amount of free water. |

From the data shown in Table I it can be seen that gum levels of 0.1 weight percent (Examples 1 and 2) can be used to form gels although the amount of free water is significant. With a gum level of 0.25 weight percent (Examples 3–12), gel formation is greatly enhanced. Increasing the concentration of aluminum sulfate from 24 weight percent (Example 3) to 56 weight percent (Example 4) and 80 weight percent (Example 5) increased the rate of gel formation and improved the quality of the gel. In a like manner, note the similar effect shown in Examples 6–11 which were run at a higher level of zinc concentration, and Examples 13–17 which were run at higher levels of gum concentration. Example 12, when contrasted with Examples 6–11, shows how increasing the aluminum sulfate concentration eventually begins to reverse the previous trend, and the rate of gel formation is actually reduced. Examples 3 and 6 illustrate how increasing the concentration of zinc hastens the formation of the gel. Interestingly enough, aluminum sulfate, alone, apppears to form a complex with the gum. The addition of a promoter such as zinc metal, however, causes rapid gelling to take place as shown by the data in Table I. The combination of zinc metal, aluminum sulfate and Xanthomonas gum represents the preferred embodiment of the present invention.

To further illustrate the unique nature of the present invention, a number of different compositions (Examples 18–26) were prepared by adding Xanthomonas gum and various salts, with and without a hydrogen-displacing metal as a promoter to water. The amount of Xanthomonas gum employed (Archer Daniels Midland Co. developmental product 7097) was one gram for each 200 ml. of water, thereby giving a 0.5 weight percent aqueous gum solution. After the addition was complete, the ingredients were mixed in a Waring blending for one minute and then allowed to stand in a quiescent state. The appearance of the resulting gel, if any, was then noted. The amount of hydrogen-displacing metal used was 20 weight percent, based on the weight of gum present. The amount of aluminum sulfate used was 100 weight percent based on the weight of gum present. Where other salts were used, the amount of salt employed was sufficient to give essentially the same molar amount of trivalent metal as was present when aluminum sulfate was used (i.e., about 0.003 mole of trivalent metal per gram of gum). The results of these experiments are shown in Table II.

TABLE II.—FORMATION OF GELS WITH XANTHOMONAS GUMS

| Example No. | Amount of gum, weight percent based on water | Trivalent Metal Salt | Hydrogen displacing metal | Remarks |
|---|---|---|---|---|
| 18 | 0.50 | $CrCl_3 \cdot 6H_2O$ | Ni | Some gel in ½-hour; very good gel in 4 hours. |
| 19 | 0.50 | $Cr_2(SO_4)_3$ | Ni | Some gel in one hour; very good gel in 4 hours. |
| 20 | 0.50 | $Fe_2(SO_4)_3 \cdot 9H_2O$ | | Immediate gel; very good. |
| 21 | 0.50 | $Fe_2(SO_4)_3 \cdot 9H_2O$ | Zn | Gelled before it could be removed from the blender. |
| 22 | 0.50 | $CrCl_3 \cdot 6H_2O$ | Zn | Immediate gel. |
| 23 | 0.50 | $Cr_2(SO_4)_3$ | Zn | Very good gel, but it takes several hours to develop. |
| 24 | 0.50 | $Al_2(SO_4)_3 \cdot 18H_2O$ | Zn | Immediate gel. |
| 25 | 0.50 | $Al_2(SO_4)_3 \cdot 18H_2O$ | Ni | Gels in 30–60 minutes. |
| 26 | 0.50 | $CrCl_3 \cdot 6H_2O$ | | Very soft gel after several hours; still soft after 16 hours. |

From Table II, it can be seen that trivalent metal salts, alone, can be used to gel water which has been previously thickened with a small amount of Xanthomonas gum. See Examples 20 and 26. In this respect, $Fe_2(SO_4)_3$ is extremely effective. It is further shown that the addition of a hydrogen-displacing metal, e.g. zinc, rapidly accelerates gel formation. See Examples 18–19 and 21–25. Zinc is a highly effective hydrogen-displacing metal and is especially preferred.

In further support of the unique nature of the present invention, a number of compositions falling outside the scope of this invention were prepared. These compositions, all prepared in substantially the same manner as Example 18–26, were totally ineffective. Illustrative of these non-gelling combinations (non-gelling in a 0.5 weight percent gum solution) are zinc metal and $CuSO_4$; zinc metal and $H_2SO_4$; $ZnSO_4 \cdot 6H_2O$, alone; and $ZnSO_4 \cdot 6H_2O$ and $Al_2(SO_4)_3 \cdot 18H_2O$. In none of these instances was there any sign of gel formation within a reasonable period of time (e.g. 12 hours).

From the foregoing examples and description, it should be apparent that a new technique for gelling water has been developed which offers significant advantages over prior art techniques. Moreover, the gels can be reversed with strongly alkaline materials, e.g. NaOH, to again create a gum-thickened solution.

What is claimed is:

1. A composition suitable for use as a gelling agent for water, which composition consists essentially of Xanthomonas gum, 5 to 35 weight percent, based on the weight of gum, of hydrogen-displaying metal, and 50 to 200 weight percent, based on the weight of gum, of trivalent metal salt.

2. A composition as defined in claim 1 wherein said metal is zinc.

3. A dry, solid composition suitable for use as a gelling agent for water which consists essentially of Xanthomonas gum, 5 to 35 weight percent, based on the weight of gum, of finely divided zinc metal, and 50 to 200 weight percent, based on the weight of gum, of aluminum sulfate.

4. A method for producing a water gel which comprises
(1) thickening water by adding, to the water, from 0.2 to 0.75 weight percent based on the weight of water of a biochemically-synthesized, water-soluble polysaccharide produced by bacteria of the genus Xanthomonas,
(2) gelling the so-thickened water by adding thereto from 5 to 35 weight percent, based on the weight of polysaccharide, finely-divided zinc metal and 50 to 200 weight percent, based on the weight of polysaccharide, aluminum sulfate.

5. A water gel consisting essentially of water, from 0.2 to 0.75 weight percent of a biochemically-synthesized, water-soluble polysaccharide produced by bacteria of the genus Xanthomonas, from 5 to 35 weight percent based on the weight of polysaccharide of finely-divided zinc metal and from 50 to 200 weight percent, based on the weight of polysaccharide of aluminum sulfate.

6. A method for producing a water gel which comprises
(1) thickening water by adding, to the water, a thickening amount of a biochemically-synthesized, water-soluble polysaccharide produced by bacteria of the genus Xanthomonas,
(2) gelling the so-thickened water by adding thereto a sensible amount sufficient to gel the thickened water of ferric sulfate or chromic chloride.

7. A water gel consisting essentially of water, from 0.2 to 0.75 weight percent of a biochemically-synthesized, water-soluble polysaccharide produced by bacteria of the genus Xanthomonas and from 50 to 200 weight percent, based on the weight of polysaccharide, of ferric sulfate or chromic chloride.

8. A method for producing a water gel which comprises
(1) thickening water by adding thereto a thickening amount of Xanthomonas gum,
(2) gelling the so-thickened water by adding thereto sensible amounts sufficient to gel the thickened water of trivalent metal sulfate and a hydrogen-displacing metal.

9. A method as defined in claim 8 wherein said metal comprises zinc.

10. A method as defined in claim 8 wherein said metal comprises nickel.

References Cited

UNITED STATES PATENTS 2,001,070   5/1935   Shankweiler et al. __ 252—316 X
3,228,855   1/1966   Cadmus et al. ____ 252—316 X LEON D. ROSDOL, *Primary Examiner.*

R. D. LOVERING, *Assistant Examiner.*

UNITED STATES PATENT OFFICE
CERTIFICATE OF CORRECTION

Patent No. 3,383,307                                                  May 14, 1968

Donald C. Goetz

It is certified that error appears in the above identified patent and that said Letters Patent are hereby corrected as shown below:

Column 1, line 50, "powdered" should read -- powered --. Column 2, lines 44 and 48, "Xanthomonas", each occurrence, should read -- _Xanthomonas_ --. Column 4, line 5, "alternately" should read -- _alternatively_ --. Column 6, line 69, "hydrogen-displaying" should read -- hydrogen-displacing --.

Signed and sealed this 27th day of January 1970.

(SEAL)
Attest:

Edward M. Fletcher, Jr.                                    WILLIAM E. SCHUYLER, JR.
Attesting Officer                                                 Commissioner of Patents